United States Patent [19]

Watts

[11] Patent Number: 5,343,395

[45] Date of Patent: Aug. 30, 1994

[54] AIRCRAFT LANDING GUIDANCE SYSTEM AND METHOD

[76] Inventor: Alan B. Watts, 203 Joachim Dr., Gulf Breeze, Fla. 32561

[21] Appl. No.: 935,438

[22] Filed: Aug. 26, 1992

[51] Int. Cl.⁵ .......................... G05D 1/06; G06F 15/50
[52] U.S. Cl. ..................................... 364/428; 364/449; 364/443; 364/434; 364/433; 340/948; 340/951; 345/139
[58] Field of Search ............... 364/430, 428, 433, 427, 364/429, 431.07, 432, 434, 435, 442, 443, 449; 340/729, 948, 951, 952, 947, 967, 976, 972, 988, 995, 990, 973; 358/103; 244/183

[56] References Cited

U.S. PATENT DOCUMENTS

| | | | |
|---|---|---|---|
| 2,784,307 | 3/1957 | Burton | 340/952 |
| 3,605,083 | 9/1971 | Kramer | 340/972 |
| 3,643,213 | 2/1972 | Yurasek et al. | 340/972 |
| 3,711,826 | 1/1973 | La Russa | 340/972 |
| 3,784,969 | 1/1974 | Wilckens et al. | 340/26 NA |
| 3,786,505 | 1/1974 | Rennie | 343/7 ED |
| 3,789,356 | 1/1974 | Harenberg, Jr. et al. | 340/27 |
| 3,843,554 | 10/1974 | Aykan et al. | 252/468 |
| 4,057,782 | 11/1977 | Muller | 340/27 AT |
| 4,316,252 | 2/1982 | Cooper | 364/428 |
| 4,368,517 | 1/1983 | Lovering | 364/428 |
| 4,419,079 | 12/1983 | Georges et al. | 340/976 |
| 4,419,731 | 12/1983 | Puffett | 364/428 |
| 4,825,374 | 4/1989 | King et al. | 364/433 |
| 4,999,780 | 3/1991 | Mitchell | 364/428 |
| 5,047,942 | 9/1991 | Middleton et al. | 364/428 |
| 5,101,357 | 3/1992 | Tempelhof | 364/449 |
| 5,115,398 | 5/1992 | De Jong | 364/443 |

OTHER PUBLICATIONS

"GPS 100 AVD personal Navigator ™", Garmin International, Inc., No date.
"1st Class Moving Map", Digital Sky, No date.
"KNS 80 Integrated NAV System", Allied-Signal Aerospace Company, No date.

*Primary Examiner*—Thomas G. Black
*Assistant Examiner*—Stephen J. Walder, Jr.
*Attorney, Agent, or Firm*—Nixon & Vanderhye

[57] ABSTRACT

An aircraft navigational facilitation system (20) and method of use thereof operates in conjunction with conventional apparatus which provides aircraft current situational information. The system includes a memory (22) for storing runway and landing information for each of a plurality runways. An input device, such as a keyboard (24), is provided for selecting a destination runway. The system further includes a video display device (28) which simulates the view from a cockpit of the aircraft, with the view including the destination runway. The video display device is driven by a processor (26) which uses the current situational information and the runway information for periodically generating display signals for the video display device. The display signals cause the video display to provide an updated and scaled simulated three dimensional view of a perimeter of the destination runway from a perspective of the cockpit of the aircraft. The video display device also provides further information including runway identification information, runway centerline, and an indication of a projected touch down point of the aircraft relative to the perimeter of the destination runway.

18 Claims, 16 Drawing Sheets

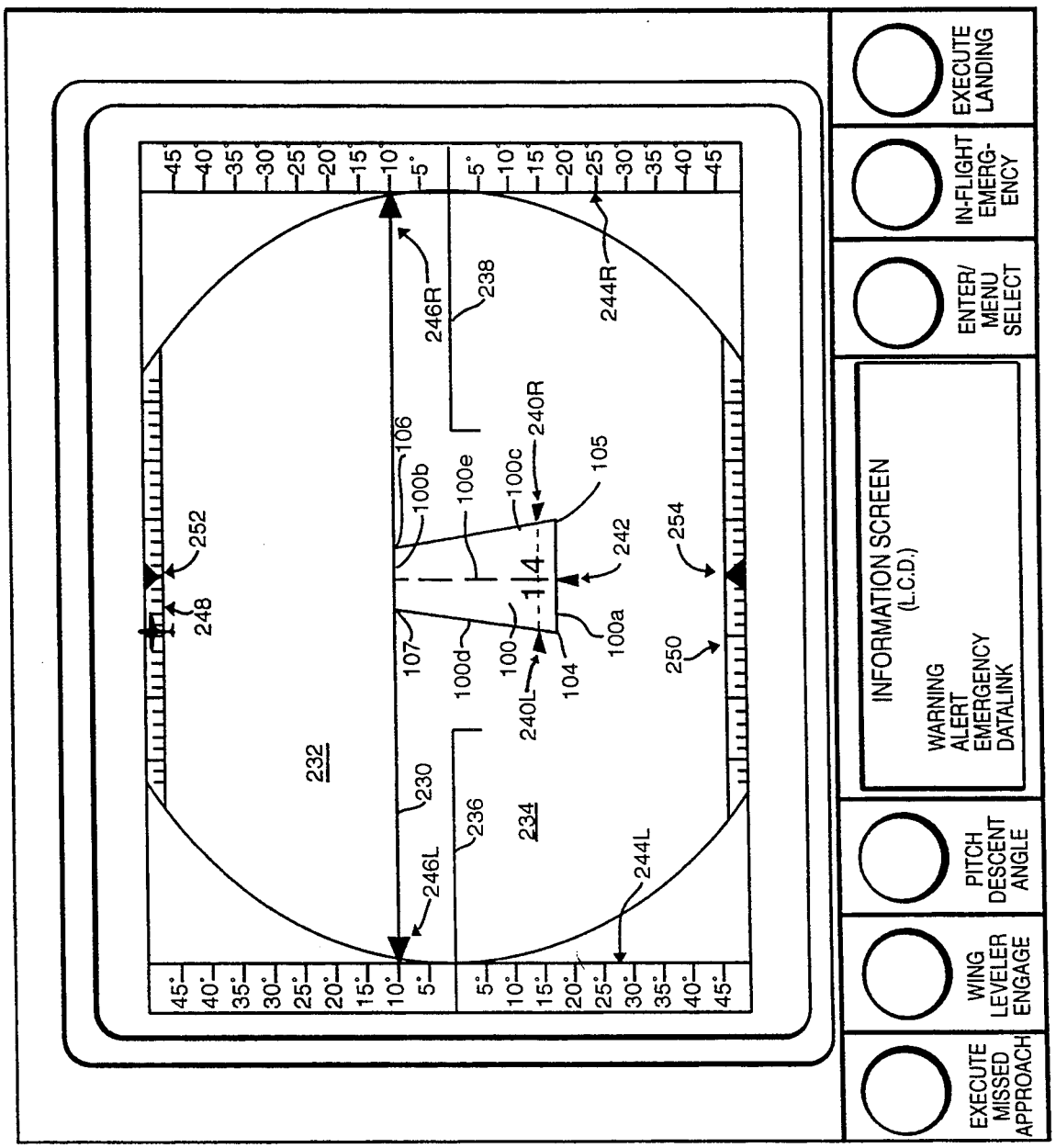

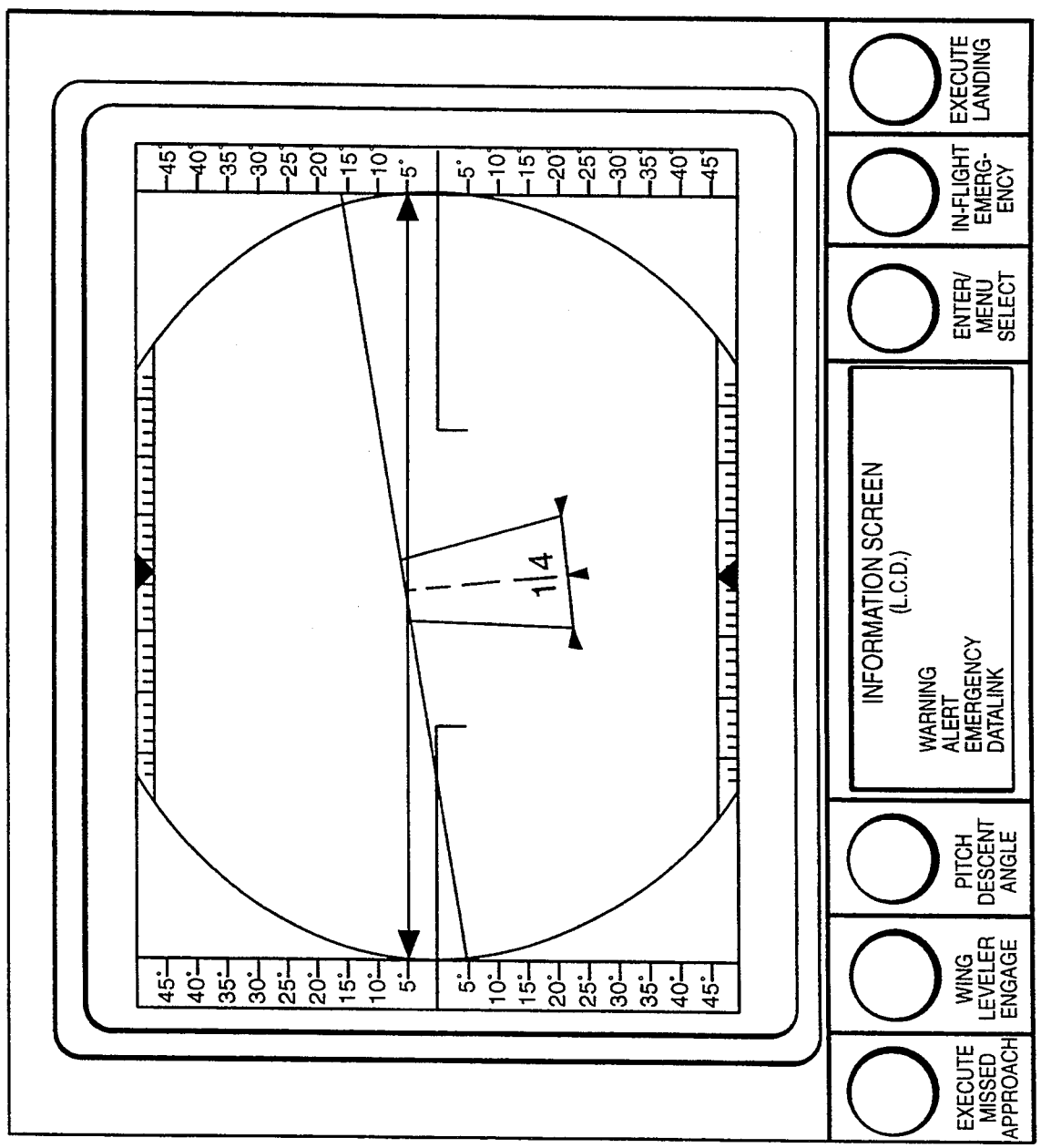

AIRCRAFT LANDING GUIDANCE SYSTEM AND METHOD

BACKGROUND

1. Field of Invention

This invention pertains to the navigation of aircraft, and particularly to method and apparatus of facilitating the landing of aircraft in inclement weather and/or low visibility conditions.

2. Prior Art and Other Considerations

Nowadays the runways at most commercial airports have ground based transmitters which emit radio wave runway signals useful for navigating an aircraft to a destination runway. Among the runway signals are a glide slope signal, a localizer signal, an outer marker signal, and an middle marker signal.

The ground based transmitters for the runway signals are located according to predetermined convention. The outer marker signal is directed essentially upwardly from the ground in a vertical direction at a horizontal distance of between about four miles to about seven miles from the near end of the runway. Similarly, the middle marker signal is broadcast at a horizontal distance of about three thousand feet from the runway. The glide slope signal is directed (at an angle to the horizontal) along the desired approach path to the runway. The localizer signal is directed out from the runway centerline to provide inbound course guidance.

Since about 1948, most aircraft equipped for instrument flight have receivers which sense the runway signals and send electrical signals to various indicators in the aircraft cockpit. For example, when the outer marker signal is received, an outer marker light (usually blue) is momentarily illuminated in the cockpit. Likewise, when the middle marker signal is received, a middle marker light (usually amber) is momentarily illuminated in the cockpit.

The localizer and glide slope signals are represented by a cross-pointer instrument in the cockpit. The cross-pointer instrument is generally a circular gauge which depicts the aircraft orientation by crosshairs. As the orientation of the aircraft changes, the crosshairs move accordingly. The vertical crosshair shows localizer deviation; the horizontal crosshair shows glideslope deviation.

When landing an aircraft, the pilot must continually monitor the cross-pointer. In addition, the pilot must monitor an intimidating number of other dials, gauges, displays, readouts and needles (including the marker signal lights). Even a seasoned pilot requires several seconds to scan the complex instrumentation in the aircraft. With the specific information gleaned from each instrument, the pilot must synthesize the information to form an instantaneous composite mental picture of the aircraft approach.

In addition to the instrument scan, the pilot must continually refer to a written approach chart such as that published by the Jeppesen Company (e.g., a "Jepp Chart"). The approach chart provides a map of the airport vicinity and prescribes a specific approach procedure for the destination runway. Every ILS airport has several unique approach charts for each runway, and the approach charts are revised monthly. Pilots typically carry in the cockpit several volumes of approach charts.

From the foregoing, it can be understood that instrument landing is inefficient and difficult. Instrument landing requires considerable guess-work by the pilot, during a critical period of time in which many other cockpit functions must be performed. Accurate interpretation of the cross-pointer is difficult enough, but the pilot must also interrogate and interpolate many other instruments in order to determine aircraft attitude, location, and other critical flight conditions.

Low visibility landings are difficult since a pilot loses his natural ability to orient himself and the aircraft to external stimuli (i.e., a visible natural horizon). Without visual orientation stimuli through the window, the pilot cannot define or affirm his positional or attitudinal situation. Rather, the pilot must individually interrogate numerous mechanical instruments; mentally store the information; and, assemble the results to formulate a composite mental picture of the overall situation. Since the composite picture requires considerable interpretation and calculation of component data, it is virtually obsolete by the time it is developed.

Under these circumstances, an efficient translation process is difficult. When data translation is inefficient, a pilot will find himself merely reacting to situational circumstances, rather than creating the desired flight situation. This dangerous phenomenon is commonly referred to as "lagging behind the aircraft." The term "cockpit overload" refers to being overwhelmed when rescanning multiple instruments. This overload of information is the leading cause of accidents and fatalities in aviation.

The prior art has attempted to enhance the instrument landing process. For example, CRT "sky maps" are commercially available for electronically displaying two dimensional airport vicinity maps for enroute navigation and flight planning.

U.S. Pat. No. 3,784,969 to Wilckens et al. discloses an aircraft landing display apparatus which provides guidance information in pictorial form. The apparatus includes a CRT which displays a generic runway in a "channel" representation, with the perspective appearance of the channel depending upon the position of the aircraft.

However, the prior art has failed to provide method and apparatus for utilizing aircraft on-board sensors for generating a customized display for a destination runway (as opposed to a generic runway representation), with the runway dimensions being accurately depicted. Nor does the prior art augment a runway display with landing information locationally keyed with reference to the customized display.

Accordingly, it is an object of the present invention to provide a system for enhancing the safety of aircraft instrument landings.

An advantage of the present invention is the provision of a system for facilitating aircraft navigation which provides a customized display for a destination runway.

Another advantage of the present invention is the provision of a system for facilitating aircraft navigation which provides a customized display for a destination runway which additionally provides landing information locationally keyed with reference to the customized display.

A further advantage of the present invention is the provision of a relatively inexpensive and easily operable system.

SUMMARY

An aircraft navigational facilitation system and method of use thereof operates in conjunction with conventional apparatus which provides aircraft current situational information for an aircraft (including aircraft roll, pitch, heading, runway glide slope, localizer, distance, and runway marker information). The system includes a memory for storing runway information for each of a plurality runways. The runway information includes runway size information and runway identification information. An input device, such as a keyboard, is provided for selecting a destination runway from the plurality of runways stored in the memory.

The system further includes a video display device which simulates the view from a cockpit of the aircraft, with the view including the destination runway. The video display device is driven by a processor system. A host processor of the processor system is connected to the aircraft current location apparatus, to the memory, to the input device, and to the video display device. When the host processor determines that the aircraft is within a predetermined distance range from the destination runway, the host processor uses the current situational information and the runway information (for the destination runway) for periodically generating display signals (e.g., draw commands). The display signals or draw commands cause a video processor included in the processing system to provide an updated and scaled simulated (essentially real time) three dimensional view of a perimeter of the destination runway from a perspective of the cockpit of the aircraft.

The video display device also provides further information. For example, identification information for the destination runway is displayed on the simulated view of the runway. In addition, with the processor using glide slope information received from the aircraft current situational information apparatus, the video display means further provides an indication of a projected touch down point of the aircraft relative to the perimeter of the destination runway. Localizer pointers and other pointers are also provided, with some of the pointers being associated with scales arranged on the perimeter of the display in order to provide a magnitude indication.

The aircraft current situational information apparatus provides an indication when the aircraft is at first predetermined distance (e.g., the outer marker) from the destination runway and additionally provides an indication when the aircraft is at second predetermined distance (e.g., the middle marker) from the destination runway. The processor generates destination runway display signals for the video display means only while the aircraft is a predetermined distance range between the outer marker the middle marker. At the middle marker, the video display switches to mode of displaying information pertaining to a missed approach procedure.

BRIEF DESCRIPTION OF THE DRAWINGS

The foregoing and other objects, features, and advantages of the invention will be apparent from the following more particular description of preferred embodiments as illustrated in the accompanying drawings in which reference characters refer to the same parts throughout the various views. The drawings are not necessarily to scale, emphasis instead being placed upon illustrating the principles of the invention.

FIGS. 5A-5J are schematic representations of example displays appearing on a display screen for different locations and orientations of an aircraft.

DETAILED DESCRIPTION OF THE DRAWINGS

Figure 1:
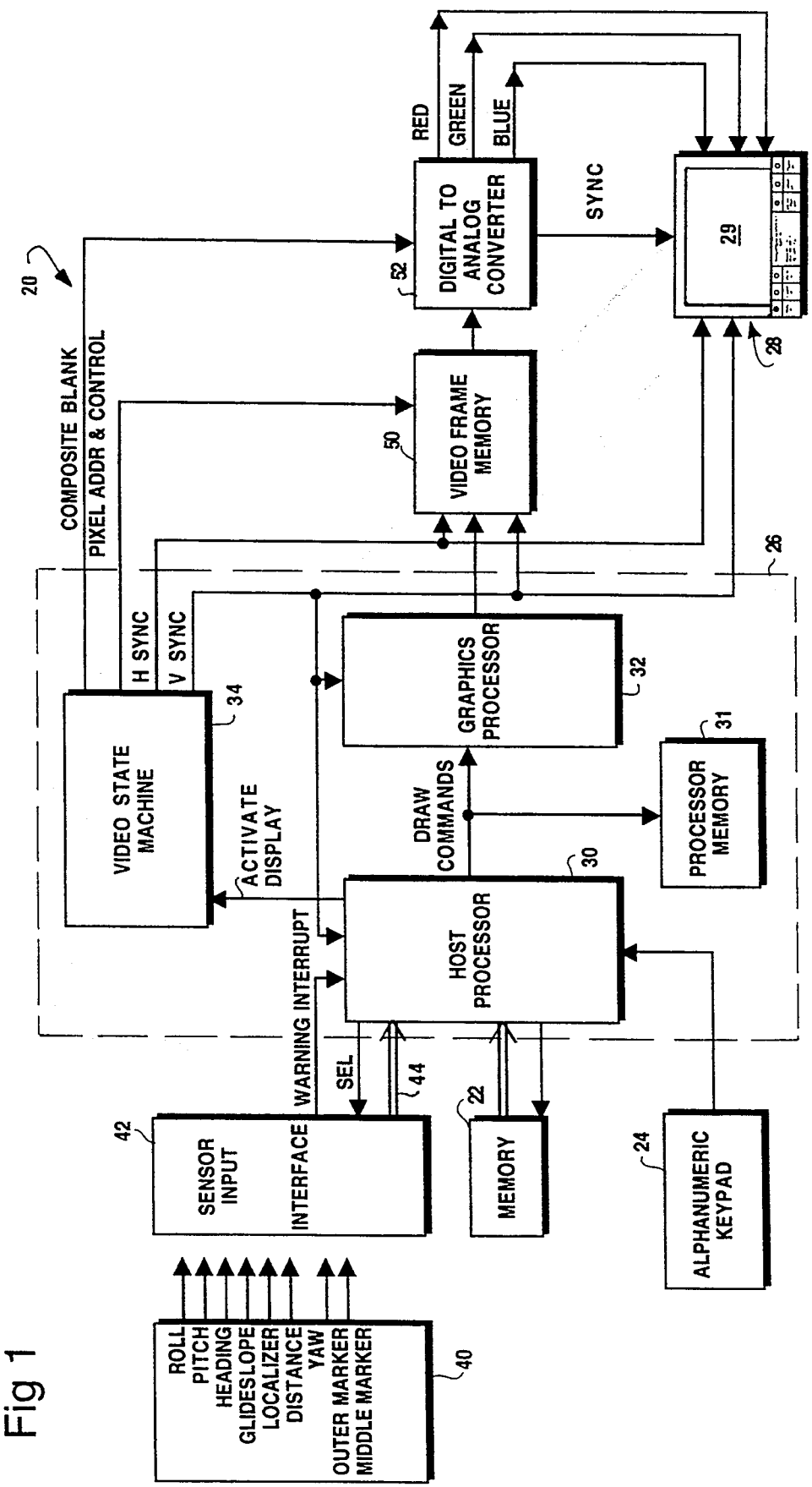
FIG. 1 is a schematic view of a navigational facilitation system according to an embodiment of the invention.

FIG. 1 shows an aviation guidance system 20 for facilitating navigation of an aircraft. The system 20 includes a memory device 22 such as compact disk read-only-memory (CD ROM); a data entry or input device such as keyboard or keypad 24; a processor system (depicted and freed by the broken line 26); and, a display device 28 including a display screen 29. The system 20 is located in the cockpit of an aircraft, with the memory 22, keypad 24, being readily accessible and the display device 28 being readily viewable by the pilot.

As discussed in more detail below, the processor 26 includes a host processor 30, a double-buffered processor memory 31, a graphics processor or video processor 32, and a video state machine 34. The host processor 30 handles data acquisition, computes aircraft position, controls external devices such as the memory 22, and (in double buffer alternating fashion) loads draw commands into a selected one of double output buffers of memory 31 for transmission to the graphics processor 32. The host processor 30 is connected to receive serial input from the keypad 24, including input indicative of a selected destination runway. The host processor 30 is connected to the memory 22 in order to access a selected memory record therein corresponding to the destination runway, and to receive the contents of the selected memory record. The double output buffer memory 31 is also connected to the video processor 32 whereby draw commands from a selected buffer are transmitted to the video processor 32. In one embodiment, the host processor 30 is an Intel 80486 general purpose processor.

The memory 22 has stored therein runway information for a plurality of runways. For example, in the illustrated embodiment wherein the memory 22 is a CD ROM, runway information for each runway at every airport in the United States is stored. For each runway there is stored a record of runway information. The runway information includes information pertaining to the size of the runway (e.g., length and width), the heading and position of the runway, as well as runway identification number (the runway "number" as seen from the air).

Although the memory 22 of the embodiment of FIG. 1 takes the form of a CD ROM, it should be understood that other types of nonvolatile storage devices can be utilized, including floppy disk, UV/EEPROM integrated circuits, or PCMCIA card technology.

The system 20 receives several signals indicative of aircraft current situational information. These current situational information signals may include without limitation aircraft roll, aircraft pitch, aircraft heading, runway glide slope, localizer, distance, runway outer marker, and runway middle marker. In one mode of the invention, the aircraft current situational information signals are available from connections to standard, pre-existing on-board sensor apparatus installed on the aircraft. In another mode, a separate sensor unit installable on-board the aircraft contains the current location sensor apparatus and thereby obviates connection to the pre-existing apparatus. FIG. 1 shows the aircraft current information signals as collectively emanating from a receiver device 40, which represents either the pre-existing on-board sensors or the separate sensor unit.

In the mode wherein the aircraft current location sensor apparatus is pre-existing, the localizer signal, the runway glide slope signal, the runway outer marker signal, and the runway middle marker signal are all obtained from a superheterodyne receiver generally located on the underside of the aircraft. In the same mode, the distance signal is obtained as a signal sent from a VOR receiver on the aircraft to the aircraft's distance measuring equipment (DME). In the same mode, the aircraft heading is obtained from the directional gyro, and the pitch and roll signals are obtained from the attitude gyro (these gyros being situated in the aircraft, e.g., the aircraft wing).

In the mode of the invention utilizing a separate sensor unit, receivers and gyros similar to the pre-existing mode are packaged in a housing for installation onboard the aircraft without having to tap pre-existing apparatus.

In the embodiment of FIG. 1, analog aircraft current situational information signals from receiver 40 are (after appropriate scaling and level adjustment) applied to the host processor 30 through a sensor input interface 42. The input interface 42 scales and level adjusts the input signals applied thereto and, as appropriate, converts analog input signals to a digital output signal using an internal analog-to-digital converter. In this respect, when requiring a particular position information signal, the host processor 30 uses a SEL signal to request the sensor input interface 42 to convert the required signal into a digital format and to multiplex the digitally converter signal on bus 44 to the host processor 30.

Depending on the apparatus employed, many of the aircraft current situational information signals described above are provided in both analog and digital format, with the result that in other embodiments some or all of the digital position information signals can be multiplexed though the sensor input interface 42 to the host processor without undergoing analog-to-digital conversion. Such is particular true in aircraft having an autopilot. Moreover, in another embodiment, current situational information signals are provided to the host processor 30 by a global positioning system (GPS) such as a Garmin Model GPS 100 AVD via a RS-232 serial interface. A smoothing algorithm is employed in connection with the GPS signals to overcome signal variations at each update point.

As indicated above, the processor system 26 also includes the graphics processor 32 (such as a Texas Instruments 34020 graphics processor). The graphics processor 32 is connected to receive draw commands from the host processor 30. The graphics processor 32 formats records for storing in a video frame memory 50. The digital records stored in the video frame memory 50 contain information for generating a screen display on the display device 28. In particular, the video frame memory has stored therein color information for each pixel of the display device 28. However, the information in the digital records of the video frame memory 50 must first be converted to an analog format by a digital to analog converter (DAC) 52 before application to the display device 28.

Figure 2:
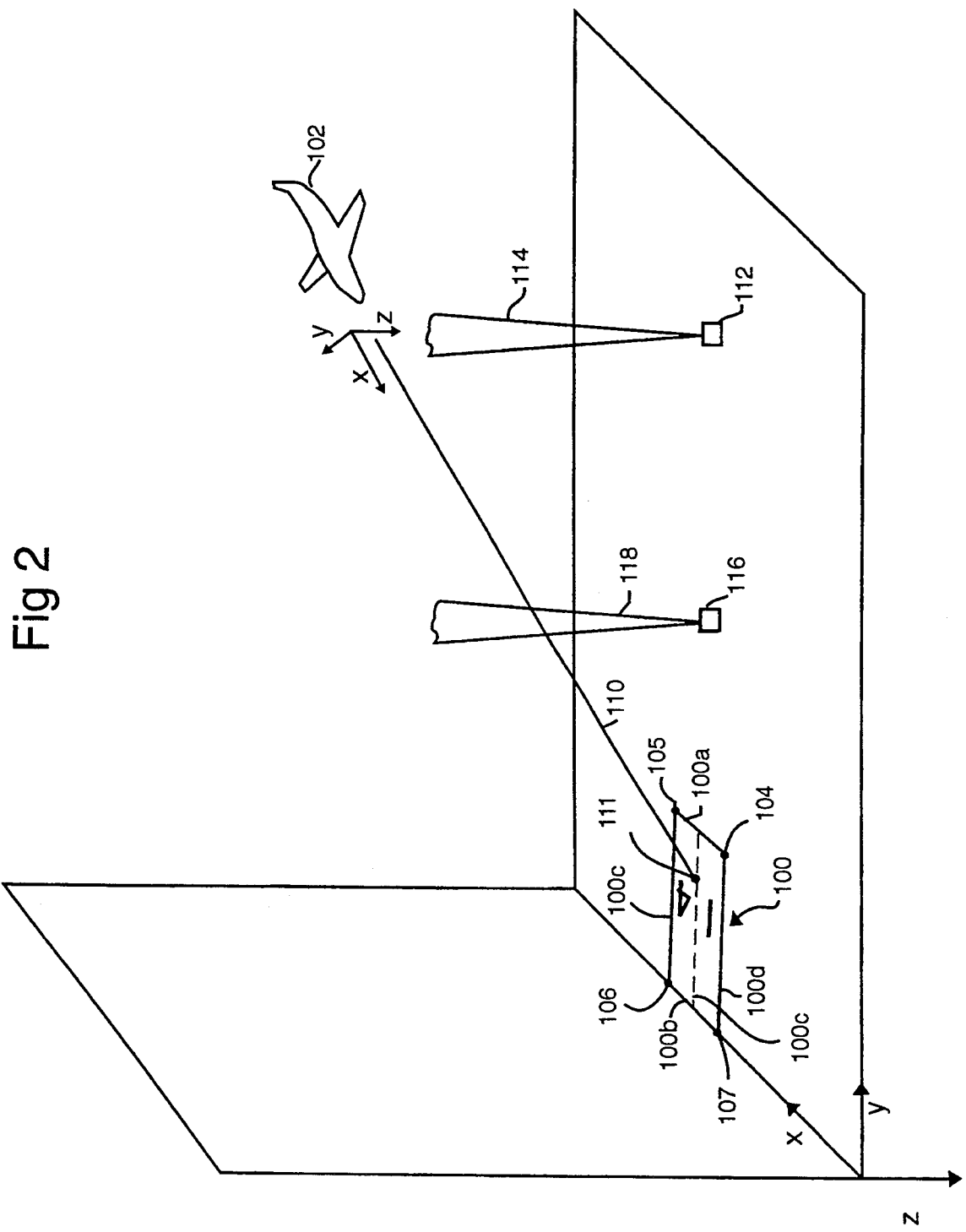
FIG. 2 is an isometric schematic view showing a coordinate system of the ground (including a destination runway) and a coordinate system of an aircraft, together with a glide slope signal and marker signals of the destination runway.

Prior to explaining the operation of the system 20, reference is made to FIG. 2. FIG. 2 shows the relative orientation of a coordinate system for a destination runway 100 and an approaching aircraft 102. The runway 100 has a near width edge 100a, a far width edge 100b, a right longitudinal edge 100c, a left longitudinal edge 100d, and a centerline 100e. For purposes of graphics display, the far width edge 100b is collinear with the horizon and the X axis of the ground coordinate system. The longitudinal edges of the runway are parallel to the Y axis of the ground coordinate system, and the Z axis of the ground coordinate system is orthogonal to the plane of the X and Y axes and directed to the center of the earth.

The runway 100 has four vertices, particularly vertex 104 at the intersection of edges 100a and 100d; vertex 105 at the intersection of edges 100a and 100c; vertex 106 at the intersection of edges 100c and 100b; and, vertex 107 at the intersection of edges 100b and 100d.

FIG. 2 also shows a glide slope signal 110 broadcast by a guide slope transmitter. The glide slope signal 110 is broadcast at an angle of about 3° (depending upon terrain) above the horizontal (e.g., above the X-Y plane of the ground coordinate system). FIG. 2 also shows a glide slope-to-ground intersection point 111.

FIG. 2 further shows the positioning of an outer marker transmitter 112 (for broadcasting the outer marker signal 114) and an middle marker transmitter 116 (for broadcasting the middle marker signal 118).

The approaching aircraft 102 has its own coordinate system represented by orthogonal axes x, y, and z. The y axis extends across the width of the fuselage of the aircraft, the z axis is from the top to the bottom of the aircraft, and the x axis extends along the direction of aircraft approach.

Figure 2A:
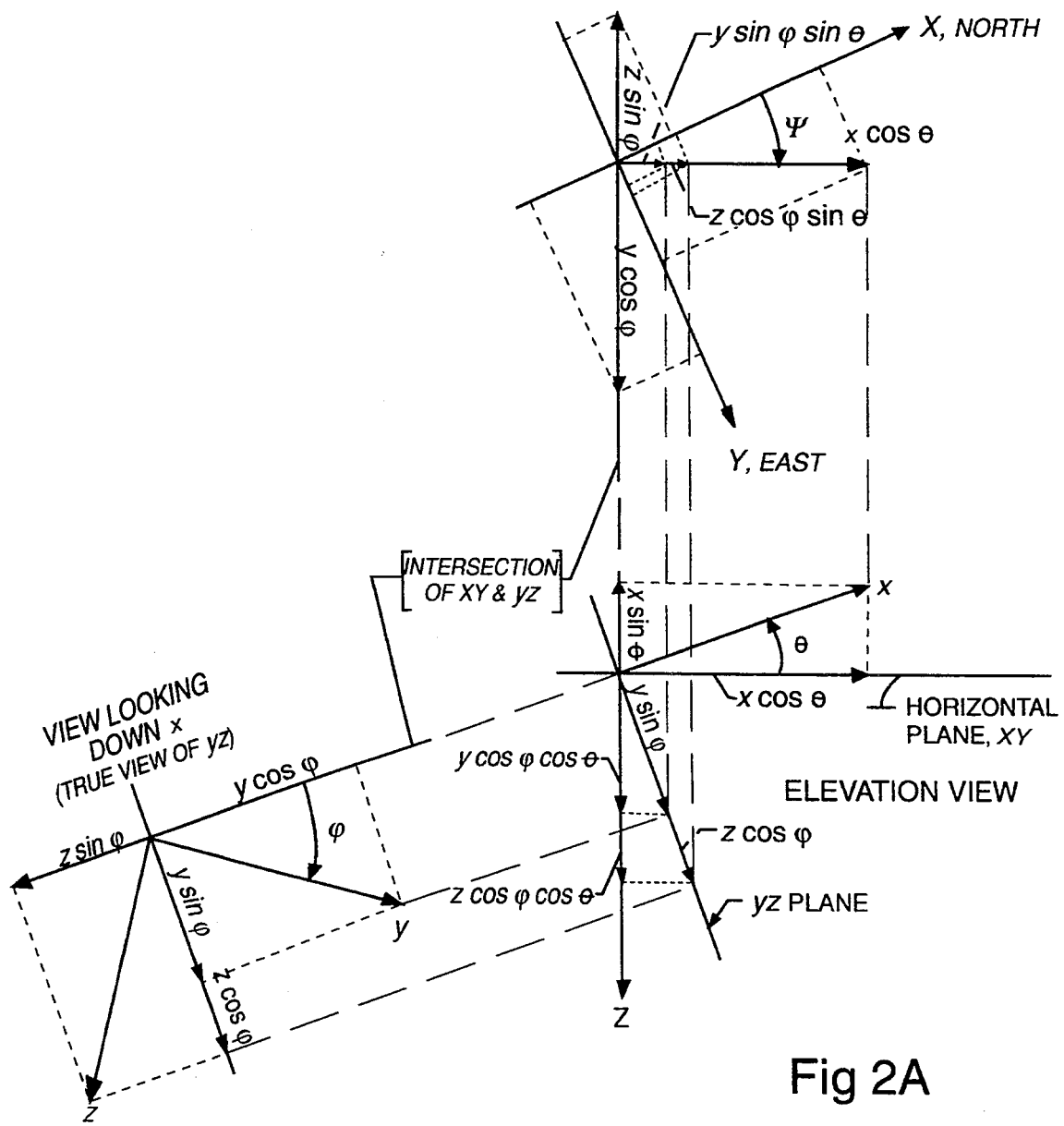
FIGS. 2A-2C are schematic views for further explaining the coordinate system of the ground and the coordinate system of an aircraft.
Figure 2B:
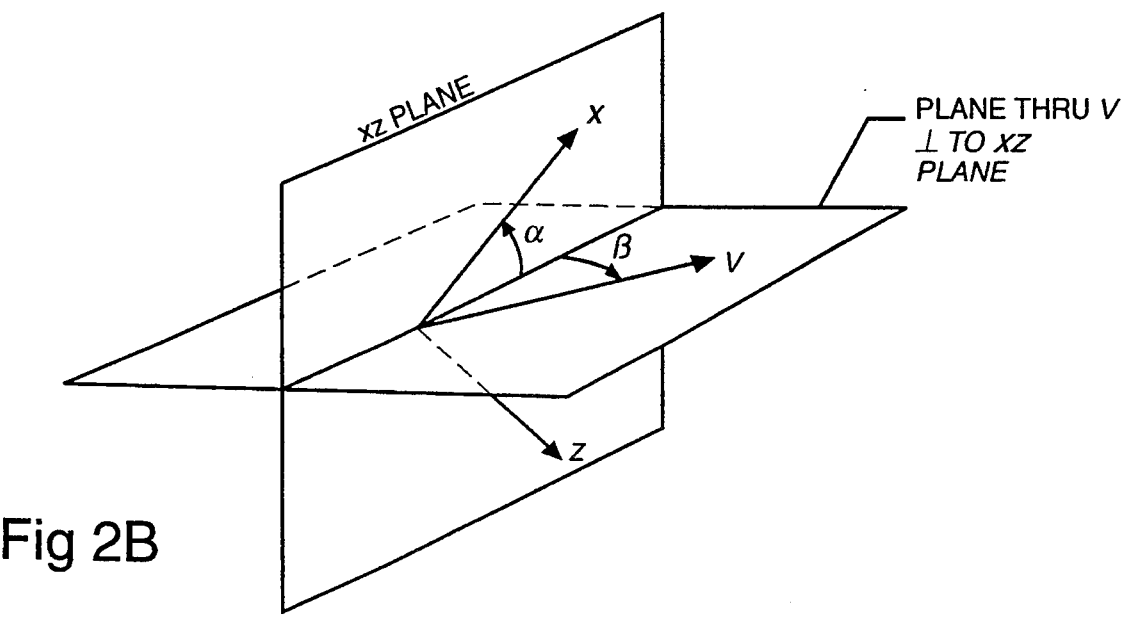
Figure 2C:
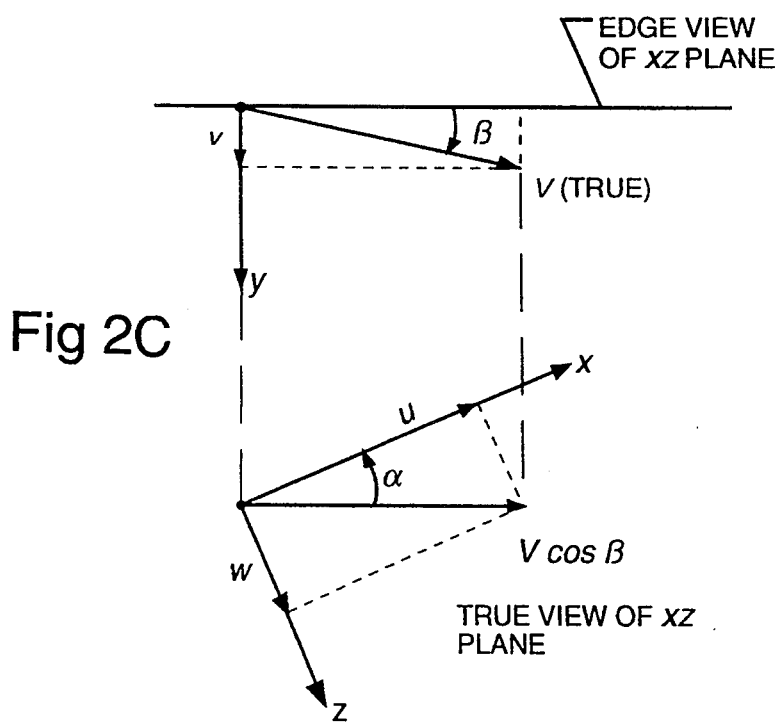

The attitude of the aircraft xyz axes relative to the ground XYZ axes can generally be defined by three angles, herein denoted by $\Phi$, $\theta$, and $\Psi$. These angles are sometimes referred to as "Euler Angles", or respectively as "roll", "pitch", and "yaw". FIGS. 2A-2C explain these angles relative to the ground coordinate system and the aircraft coordinate system. In addition, FIGS. 2A-2C show the glide slope angle $\alpha$, the localizer (sideslip) angle $\beta$, and the distance V from the runway 100 to the aircraft 102.

Figure 3:
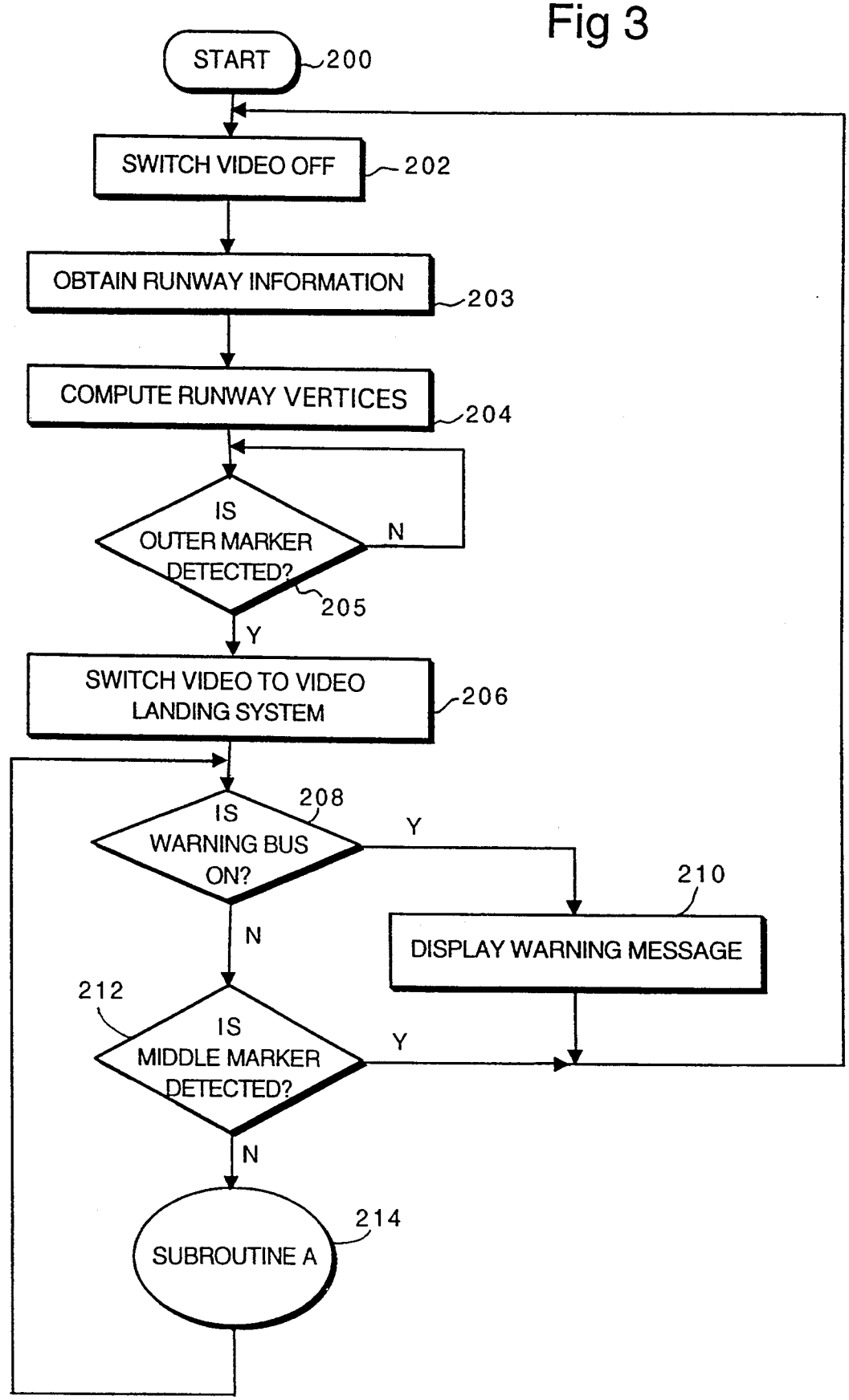
FIG. 3 is a schematic flowchart showing steps executed by a processor of the system of the embodiment of FIG. 1 during a main processing loop.

FIG. 3 is a schematic flowchart showing steps executed by the host processor 30 during a main processing routine. After start up (step 200), at step 202 the processor 30 sends signals to the graphics processor 32 for clearing any runway simulation information from the screen 29 of the display device 28.

At step 203 the processor 30 obtains runway information for the destination runway. In this regard, the processor 30 prompts the pilot to input on the keypad 24 a value which is representative of the destination runway. The processor 30 then sends commands to the memory 22 for addressing and retrieving the information recorded stored therein for the destination runway. Upon obtaining the information for the destination runway, the processor 30 knows, inter alia, the length, width, and number of the runway.

To aid the pilot, the processor 30 can generate a menu driven or scrolling display on the display device 28 from which the pilot can determine what input value is necessary to locate the information record for the selected destination runway. Alternatively, the pilot can consult a reference manual in order to determine the necessary input for the selected destination runway.

At step 204 the processor 30 uses the runway size, runway heading, and runway position information of the destination runway 100 in order to compute the vertices 104–107 in the runway coordinate system.

The processor 30 thereafter continually monitors for reception of the runway outer marker signal 114, as depicted by step 205. Monitoring of the runway outer marker signal 114 is accomplished in the embodiment of FIG. 1 by continually multiplexing the digitally converted value of the outer marker signal to the host processor 30 from the sensor input interface 42 (using the SEL signal for multiplexing control). Alternatively, when the runway outer marker signal 114 is received, an interrupt is applied to the host processor 30.

When the runway outer marker signal 114 is received, the processor 30 realizes that a runway simulation display may be generated. Accordingly, at step 206 the processor 30 enters a landing video mode, inter alia, by sending an ACTIVATE DISPLAY signal to the video state machine 34. The video state machine 34 then sends a COMPOSITE BLANK signal to the DAC 52.

Prior to jumping to a routine (shown in FIG. 4) for generating signals for the display, the processor 30 executes two status checks. First, at step 208, the processor 30 checks whether a WARNING INTERRUPT indicates whether problem or extraordinary conditions are encountered. A WARNING INTERRUPT is generated by the sensor input interface 42 when one of the current situational information signals are outside of an acceptable range. If the WARNING INTERRUPT is active, at step 210 the processor 30 generates signals for displaying (for a predetermined time) a warning message on the display device 28. After the warning message is displayed for the predetermined time, or until the problem condition is corrected, the processor 30 returns to step 202 to clear the display device 28.

As a second status check, at step 212 the processor 30 monitors for reception of the runway middle marker signal 116. The monitoring for the middle marker signal 116 is accomplished in much the same manner as the monitoring for the outer marker signal 114 as described previously. If the middle marker signal 116 is detected, the processor 30 returns to step 202 to clear any runway simulation display from the display device 28. Thus, the processor 30 only permits a runway simulation display to be provided on the display device 28 when the aircraft is between the outer marker and the middle marker. That is, the runway simulation display is generated only after reception of the outer marker signal 114 and only until reception of the middle marker signal 118.

Figure 4:
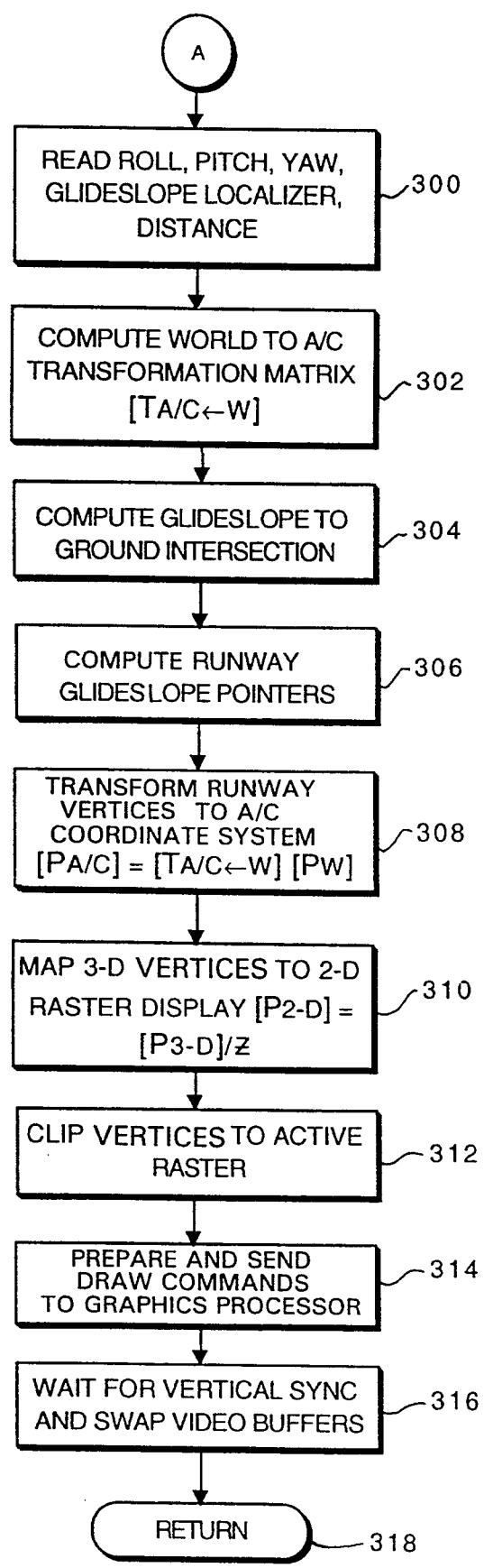
FIG. 4 is a schematic flowchart showing steps executed by a processor of the system of the embodiment of FIG. 1 for simulating a destination runway on a display screen.

If it is determined at step 212 that the middle marker signal 118 has yet to be received, the host processor 30 calls (at step 214) a routine RUNWAY SIMULATE, the steps of which are explained with reference to FIG. 4. After each call to routine RUNWAY SIMULATE at step 214, the processor 30 returns to execute the status checks of steps 208 and 212 prior to a subsequent call to routine RUNWAY SIMULATE. Thus, the routine RUNWAY SIMULATE is repeatedly executed while the aircraft is in a predetermined distance range from the runway, i.e., between the outer marker and the middle marker.

Figure 5A:
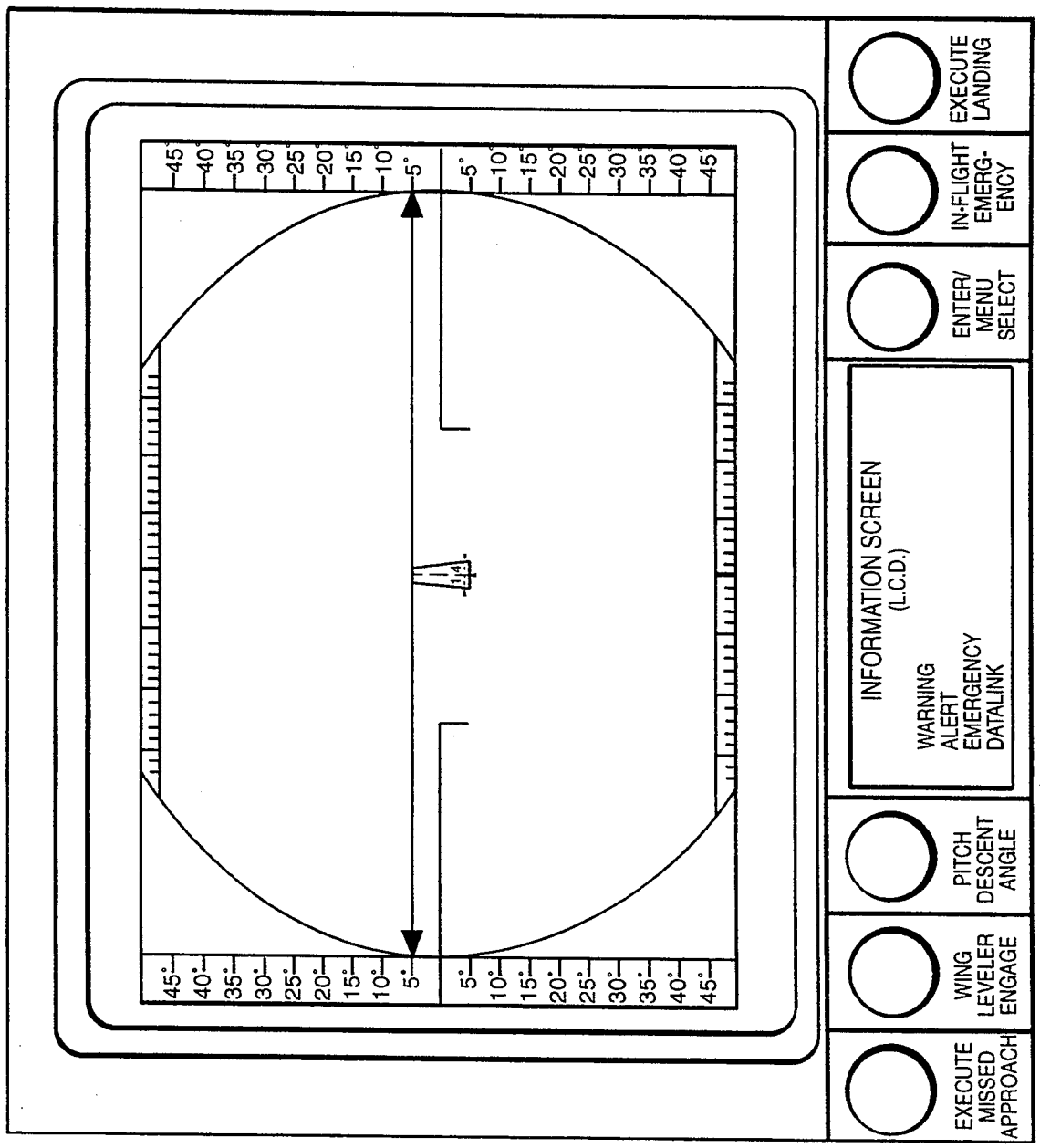

The routine RUNWAY SIMULATE is executed by the processor 30 in order to generate draw commands for ultimately providing runway simulation displays (such as those depicted in FIGS. 5A–5J) on the screen 29 of the display device 28. Prior to discussing steps executed by the routine RUNWAY SIMULATE, the format of a runway simulation display is first discussed with reference to FIG. 5C. It should be understood that the reference numerals provided in FIG. 5C are for purposes of the present explanation, and that a pilot would not view the reference numerals per se. Moreover, although reference numerals are not provided for the remaining displays to avoid obscuring other detail, identification of corresponding display elements are understood with reference to the numerals provided in FIG. 5C.

The example display of FIGS. 5A shows simulated features of the runway 100, including the runway edges 100a–100d and runway vertices 104–107, as well as the runway centerline 110e and the runway number ("14" in the present example). A horizon line 230 is collinear with the runway edge 100b. A field 232 above the horizon line 230 depicts the sky, and accordingly is blue in color. A field 234 below the horizon line 230 (excepting the runway 100) depicts the ground, and is of a contrasting and appropriate color such as brown or an orange-red.

Each display has a left wing reference line 236 and a right wing reference line 238. Both wing reference lines 236 and 238 are horizontal across the screen 29 and remain stationary. By comparing the relative position of the horizon line 230 and the wing reference lines 236 and 238, a pilot can ascertain aircraft roll. In addition, the distance separating the horizon line 230 from the wing reference lines 236 enables the pilot to visually determine whether the aircraft nose is up (see FIG. 5B) or down (see FIG. 5A), and to what degree.

Each display also has pointers generated thereon, in particular glide slope left pointer 240L, glide slope right pointer 240R, and localizer pointer 242. These pointers are shown as arrowheads which are pointed to locations on the perimeter of simulation of the runway 100. The glide slope pointers 240L, 240R indicate, given the present course, how far the aircraft will touch down from the near width edge 100a. Thus, the pointers 240L and 240R indicate a touchdown point along the length of the runway 100. Similarly, the localizer pointer 242 indicates, given the present course, how far the aircraft will touch down from the runway centerline 100e.

Each display also has several numerically graded scales provided at the perimeter of the display screen 29. Vertical scales 244L, 244R are provided at the left and right sides of the screen 29. The processor 30 generates draw commands for pitch pointers (denoted by arrows 246L, 246R) which point to the respective scales 244L, 244R. The pitch pointers 246L, 246R are always provided on the horizon line 230.

Horizontal scales 248 and 250 are also provided at the top and bottom sides of the perimeter of the display screen 29. The processor 30 generates draw commands for a second localizer pointer (denoted by arrow 252) which points to the top scale 248. The localizer pointer 252 shows the relative angular displacement from the horizontal centerline 100e. The processor 30 also generates draw commands for a heading pointer (denoted by arrow 254) which points to the bottom scale 250. The heading pointer 254 shows the relative angular displacement between the aircraft 102 and the runway 100.

The above-described pointers which point to scales provide an indication of the degree of error (if any) in either aircraft pitch, aircraft roll, localizer (i.e., with respect to the runway centerline), and aircraft heading. The pointers and scales are described below in connection with FIGS. 5A-5J.

Returning now to a discussing of the execution of routine RUNWAY SIMULATE, at step 300 the processor obtains aircraft current situational information from the receiver device 40. In particular, at step 300 the processor 30 directs that digitally converted signals for aircraft roll, pitch, yaw, slide slope, localizer, and distance be multiplexed in prescribed order into memory accessible by the processor 30.

Upon obtaining the digitally converted aircraft current situational information signals at step 300, at step 302 the processor 30 computes a world-to-aircraft transformation matrix $|T_{A/C \leftarrow W}|$. The world-to-aircraft transformation matrix $|T_{A/C \leftarrow W}|$ is used to evaluate the matrix expression $$\begin{bmatrix} X \\ Y \\ Z \end{bmatrix} = [|T_{A/C \leftarrow W}|] \begin{bmatrix} X \\ Y \\ X \end{bmatrix}$$

wherein $$[|T_{A/C \leftarrow W}|] = \begin{bmatrix} T_{1,1} T_{1,2} T_{1,3} \\ T_{2,1} T_{2,2} T_{2,3} \\ T_{3,1} T_{3,2} T_{3,3} \end{bmatrix}$$

and wherein $T_{1,1} = \cos \theta \cos \Psi$ $T_{1,2} = \sin \Phi \sin \theta \cos \Psi - \cos \Phi \sin \Psi$ $T_{1,3} = \cos \Phi \sin \theta \cos \Psi + \sin \Phi \sin \Psi$ $T_{2,1} = \cos \theta \sin \Psi$ $T_{2,2} = \sin \Phi \sin \theta \sin \Psi + \cos \theta \cos \Psi$ $T_{2,3} = \cos \Phi \sin \theta \sin \Psi - \sin \Phi \cos \Psi$ $T_{3,1} = -\sin \theta$ $T_{3,2} = \sin \Phi \cos \theta$ $T_{3,3} = \cos \Phi \cos \theta$ After computing the world-to-aircraft transformation matrix $|T_{A/C \leftarrow W}|$ (step 302), at step 304 the processor 30 computes the glide slope-to-ground intersection point 111 in terms of the aircraft coordinate system. At step 306 the processor computes the position of the glide slope pointers 240L, 240R and the localizer pointer 242. The glide slope pointers 240L, 240R are computed using the expression $V \cos \beta \sin \alpha$, where V is the distance to the runway 100, angle $\alpha$ is the angle of attack, and angle $\beta$ is the localizer (sideslip) angle as defined hereinbefore with reference to FIGS. 2B and 2C. The localizer pointer 242 is computed using the expression $V \sin \beta$.

At step 308, the processor 30 transforms each of the four vertices 104–107 of the runway 100 from the ground coordinate system to the aircraft coordinate system. The transformation is conducted using the transformation matrix $|T_{A/C \leftarrow W}|$ discussed above operating upon the three coordinates of each vertex of the runway 100.

At step 310 the processor 30 maps the three dimensional runway vertices to a two dimensional raster display using conventional mapping techniques. In so doing, the runway size and shape are adjusted for distance and perspective from the cockpit. At step 312 the processor 30 performs whatever clipping operation may be necessary (should a fragment of the runway fall outside the screen boundary). Conventional clipping techniques such as that taught by Cohen and Sutherland are suitable.

At step 314 the processor sends draw commands to the graphics processor 32. In this respect, the draw commands are loaded into a selected one of two output buffers of memory 31 for transmission to the graphics processor 32. The draw commands apprise the graphics processor 32 of the raster locations of the items to be displayed on the screen 29 of display device 28. As explained hereinbefore with reference to FIGS. 5A-5J, such items include the vertices and edges of the runway 100, the horizon line 230, the wing reference lines 236 and 238, the glide scope pointers 240L, 240R, the localizer pointer 242, the horizontal and vertical scales (e.g., scales 244L, 244R, 248, and 250), and other pointers (e.g., pointers 246L, 246R, 252, and 254).

The draw commands are prepared for use with a conventional polygonal generation graphics procedure. According to such procedure, polygons are drawn in order from farthest to nearest using a hidden surface removal technique.

After the draw commands in the selected buffer are outputted to the video processor 32, the processor 30 awaits a V SYNC (vertical synchronization) signal from the video state machine 34. Upon receipt of the V SYNC signal at step 316, the processor 30 sets buffer pointers to point to locations in the buffer (of memory 31) which was not utilized during the just-finished execution of routine RUNWAY SIMULATE. In other words, the processor 30 swaps the output buffers (of memory 31) being utilized during the double buffering technique, so that one buffer can fill while the other empties.

At step 318 the processor 30 exits the routine RUNWAY SIMULATE, thereby returning to the execute the status check steps 208 and 212 of the main routine shown in FIG. 3. As indicated before, if the middle marker signal 118 is still not received, the routine RUNWAY SIMULATE is again called at step 214, so that the steps of FIG. 4 are again executed but with updated information.

The video state machine 34 serves to synchronize the operation of the host processor 30 and the graphics processor 32 relative to the display device 28. In this regard, the video state machine 34 generates both a vertical synchronization signal (V SYNC) and a horizontal synchronization signal (H SYNC) which are applied to the host processor 30 and the video processor 32 in order to keep execution thereof in time with the video. In addition, the V SYNC and H SYNC signals are sent to the video frame memory 50 and (in the illustrated embodiment) to the display device 28. In one embodiment, the V SYNC signal occurs every 1/60 second, or every 16.67 milliseconds. In a European embodiment, the V SYNC signal occurs every 1/50 second.

In addition, the video state machine 34 generates pixel address on a bus PIXEL ADDR & CONTROL for application to the video frame memory 50. Addresses applied on the bus PIXEL ADDR & CONTROL specify locations in the memory 50 (corresponding to a pixel on the display screen 29) into which color information is to be loaded from the graphics processor 32, and from which color information is outputted to the DAC 52 for driving the associated pixel on the screen 29. Control signals on the bus PIXEL ADDR & CONTROL govern the timing of the inputting of information into the video frame memory 50 and the timing of the outputting of information from the memory 50 to the DAC 52.

In the above regard, the video frame memory 50 is also a double buffered memory, with one buffer being filled with information from the graphics processor 32 while the other buffer is inputted to the DAC 52. The video frame memory 50 is preferably a video ram (VRAM), but can also be a dynamic random access memory (DRAM) or a static RAM (SRAM).

The video display device 28 is, in the illustrated embodiment, a cathode ray tube (CRT) conventionally driven by red, green, and blue analog signals from the DAC 52. It should be understood that other types of display devices can be utilized, such as a liquid crystal display. In addition, signal transmission conventions other than those shown can be used to drive the display device. The operation of the display device 28 is synchronized with the DAC 52 by a signal SYNC.

Thus, as the routine RUNWAY SIMULATE is repeatedly called, the display screen 29 is continually updated to provide (e.g., during low visibility flight conditions) a simulated view of the ground and the destination runway as would appear from the windshield of the cockpit under visible flight conditions. The display screen 29 shows a simulation of the actual destination runway, prepared to scale and from the changing perspective of the cockpit on the basis of runway information which is particular to the destination runway.

FIGS. 5A through 5J show example of simulated views provided on screen 29 of the display device 28. In FIG. 5A, the aircraft is at the outer marker beacon (e.g., about six miles from the touchdown point). The aircraft 102 is pitched nose down at 5°. The aircraft is on the glide slope and the centerline of the runway, so that there is no glide slope error and no locator error. There is no heading error and no roll error.

Figure 5B:
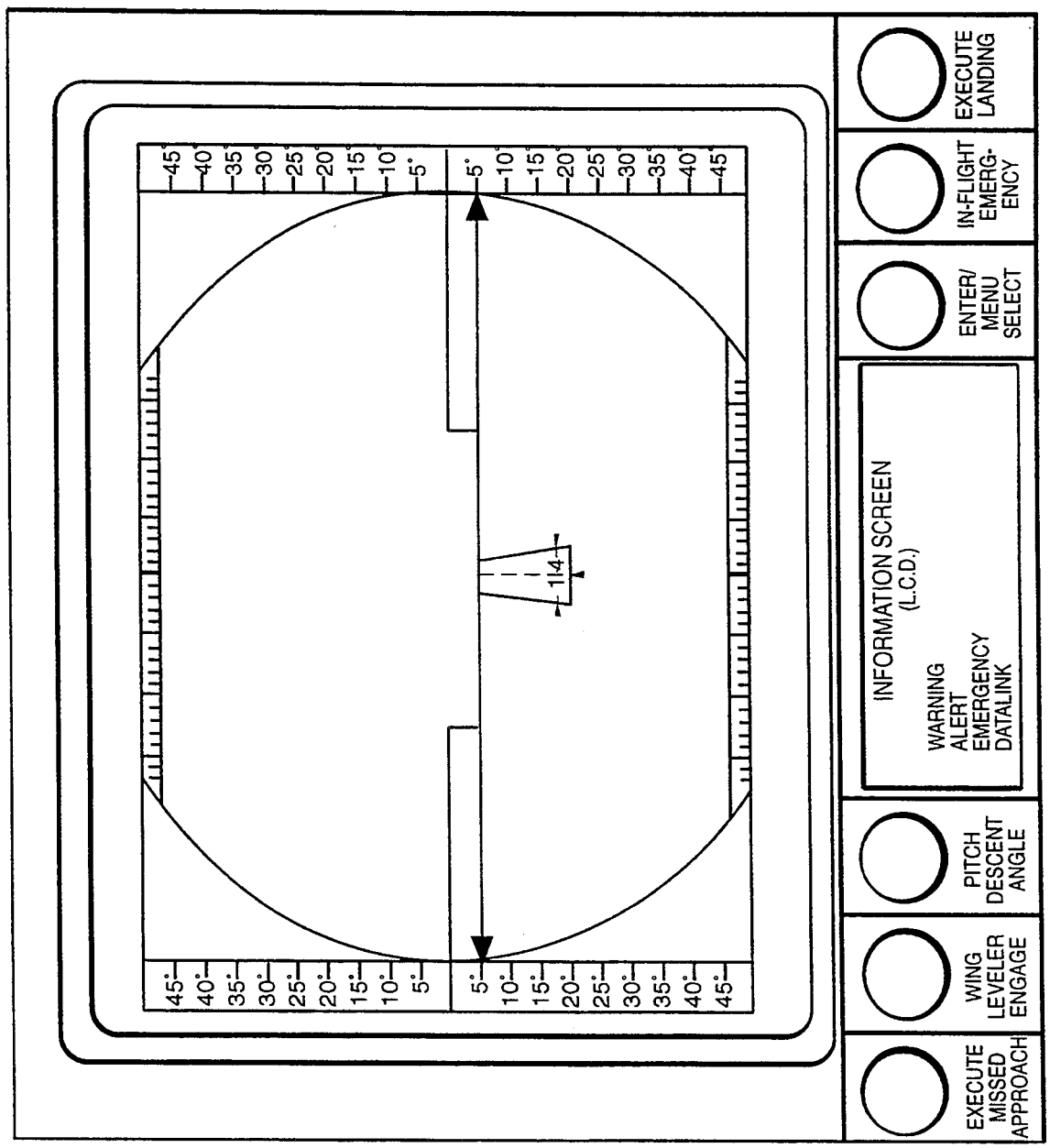

In FIG. 5B, the aircraft is about three miles from the touchdown point. The aircraft is pitched nose up at 5°. The aircraft is on the glide slope and the centerline of the runway. There is no heading error and no roll error.

In FIG. 5C, an aircraft is about three thousand feet from the touchdown point (i.e., at the middle marker). The aircraft is pitched nose down at 10°. Moreover, there is a −10° heading error. There is no roll error, no localizer error, and no glide slope error. Since the aircraft is at the middle marker, the simulation on the screen 29 will now terminate.

Figure 5D:
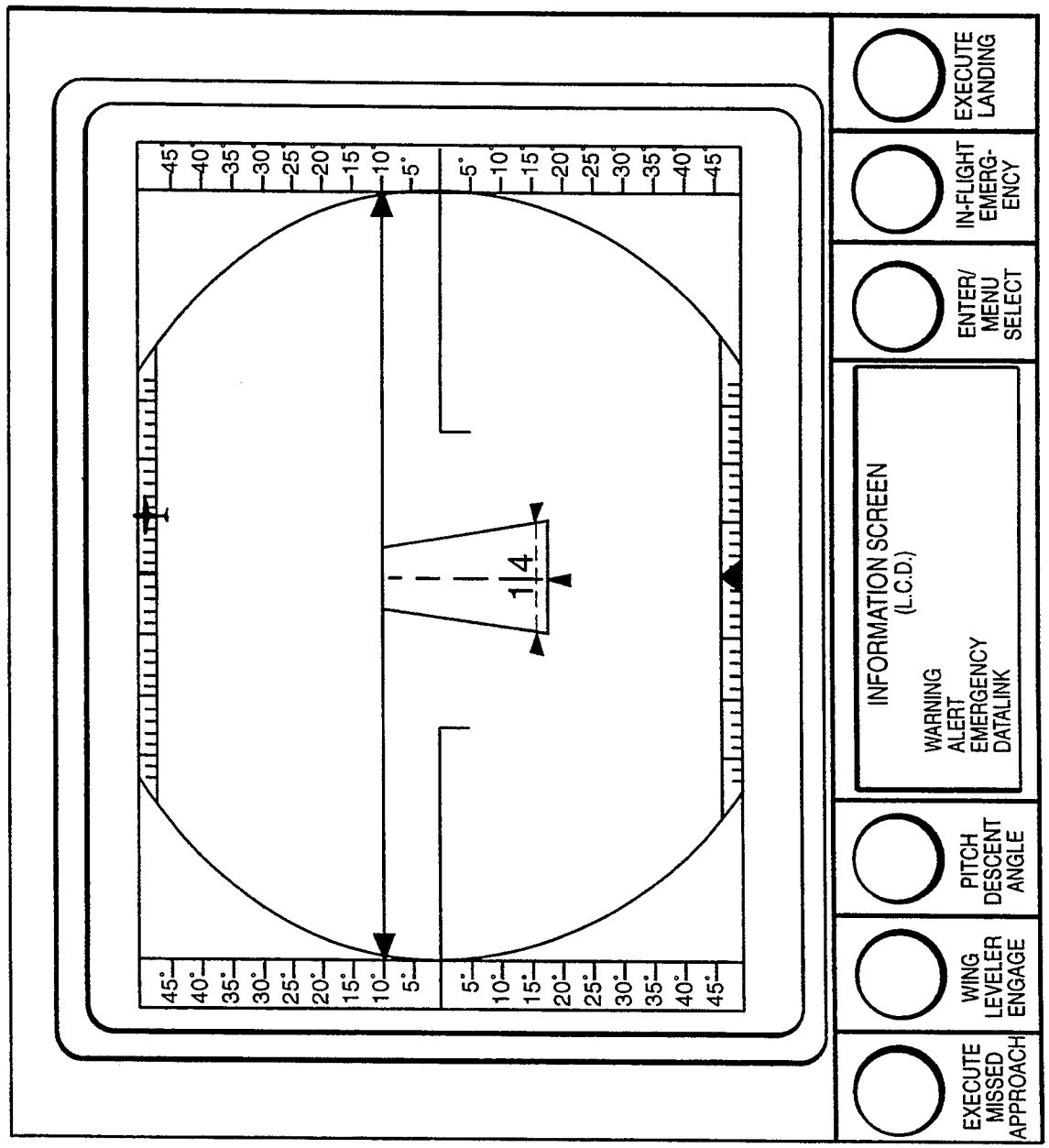

In FIG. 5D, an aircraft is also about three thousand feet from the touchdown point. The aircraft is pitched nose down at 10°. Moreover, there is a +10° heading error. There is no roll error, no localizer error, and no glide slope error.

Figure 5E:
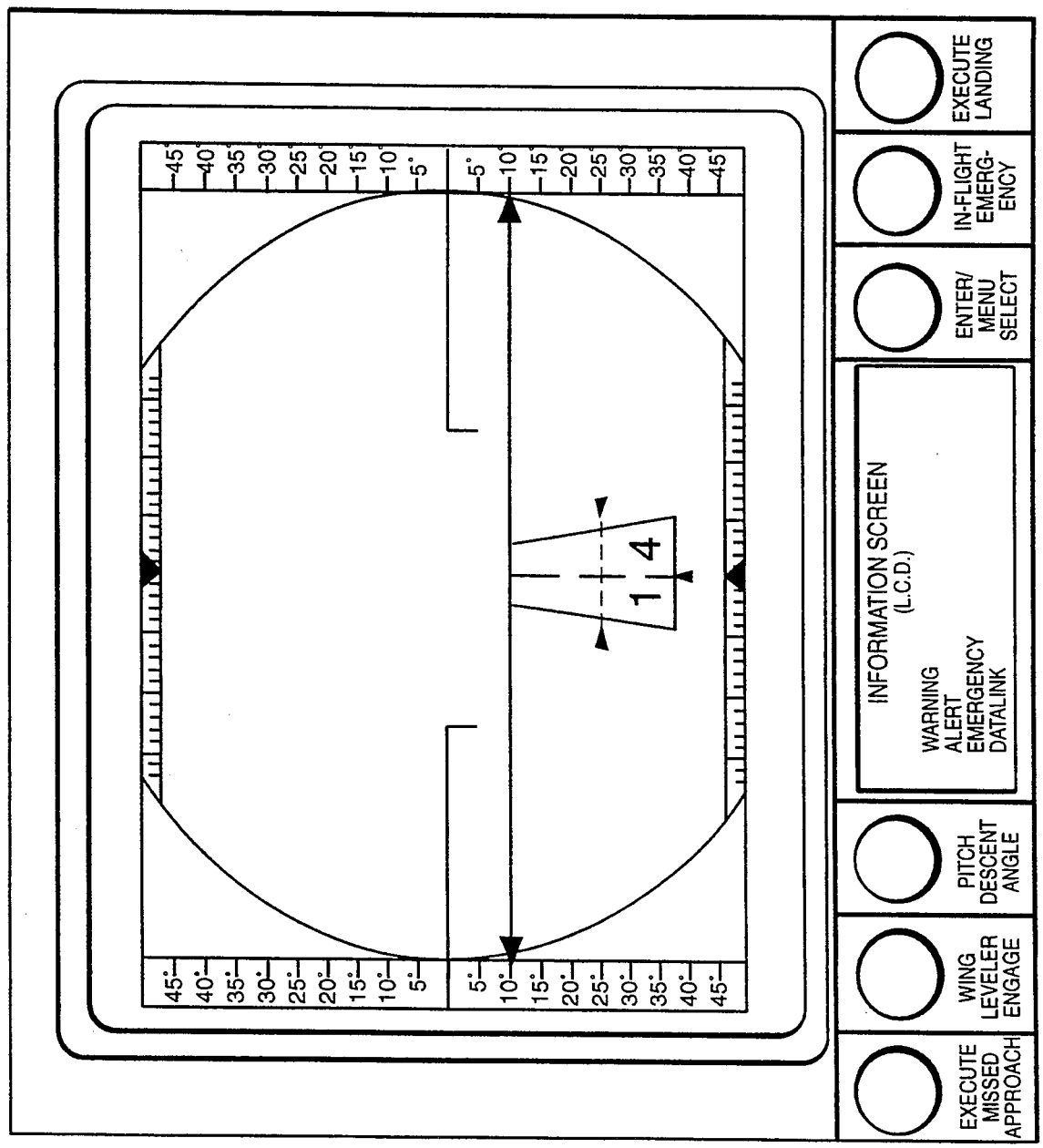

In FIG. 5E, an aircraft is also about three thousand feet from the touchdown point. The aircraft is pitched nose up at 10°. There is a glide slope error as shown by the glide slope pointers, which in this depiction indicates that the aircraft is about the glide slope to an extent that it will touchdown about 1500 feet beyond the nominal touchdown point. There is no roll error, no localizer error, and no heading error.

Figure 5F:
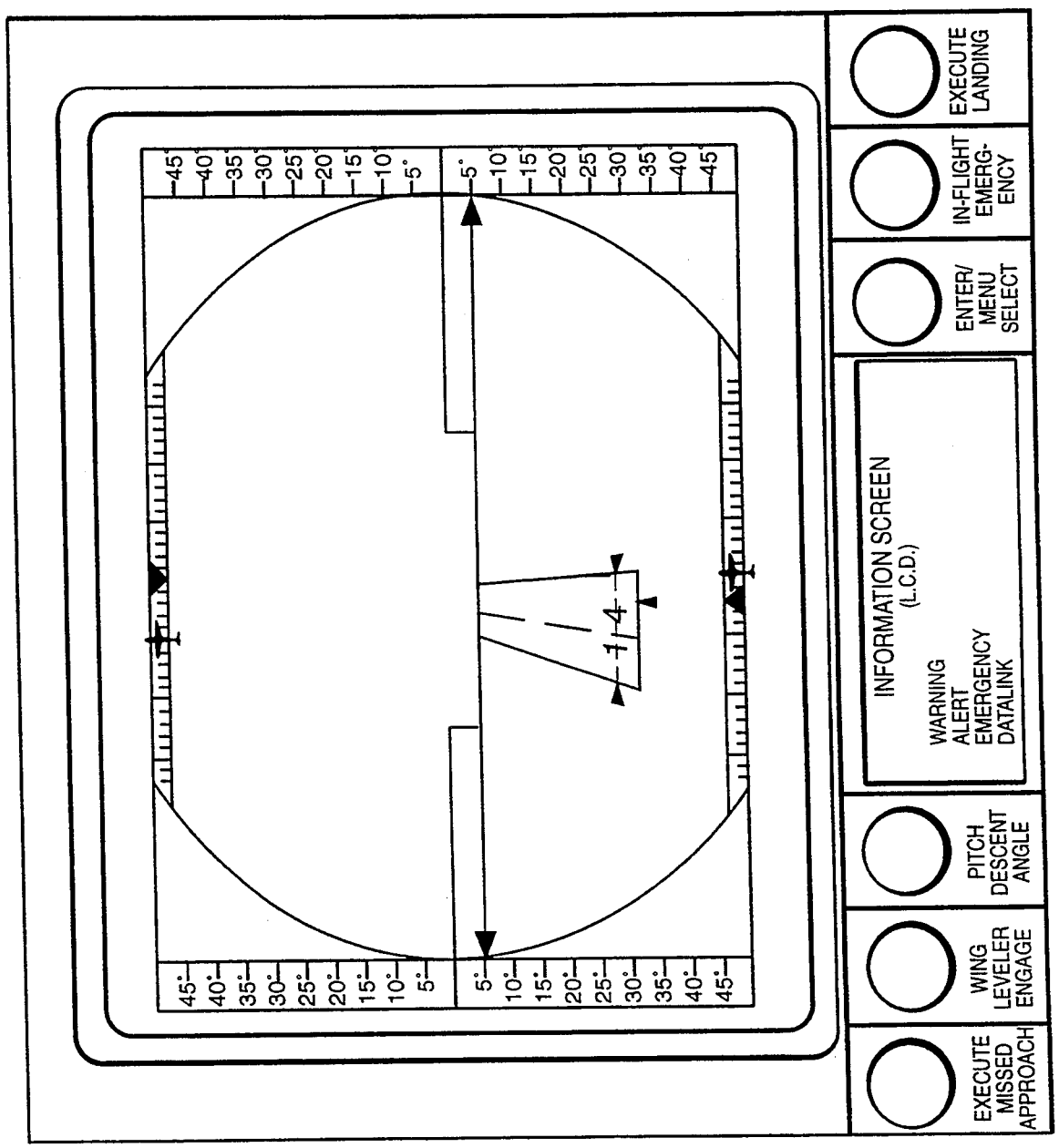

In FIG. 5F, an aircraft is also about three thousand feet from the touchdown point. The aircraft is pitched nose up at 5°. There is a −10° heading error and a localizer error (the aircraft is about one hundred feet to the right of the runway centerline). There is no roll error and no glide slope error.

Figure 5G:
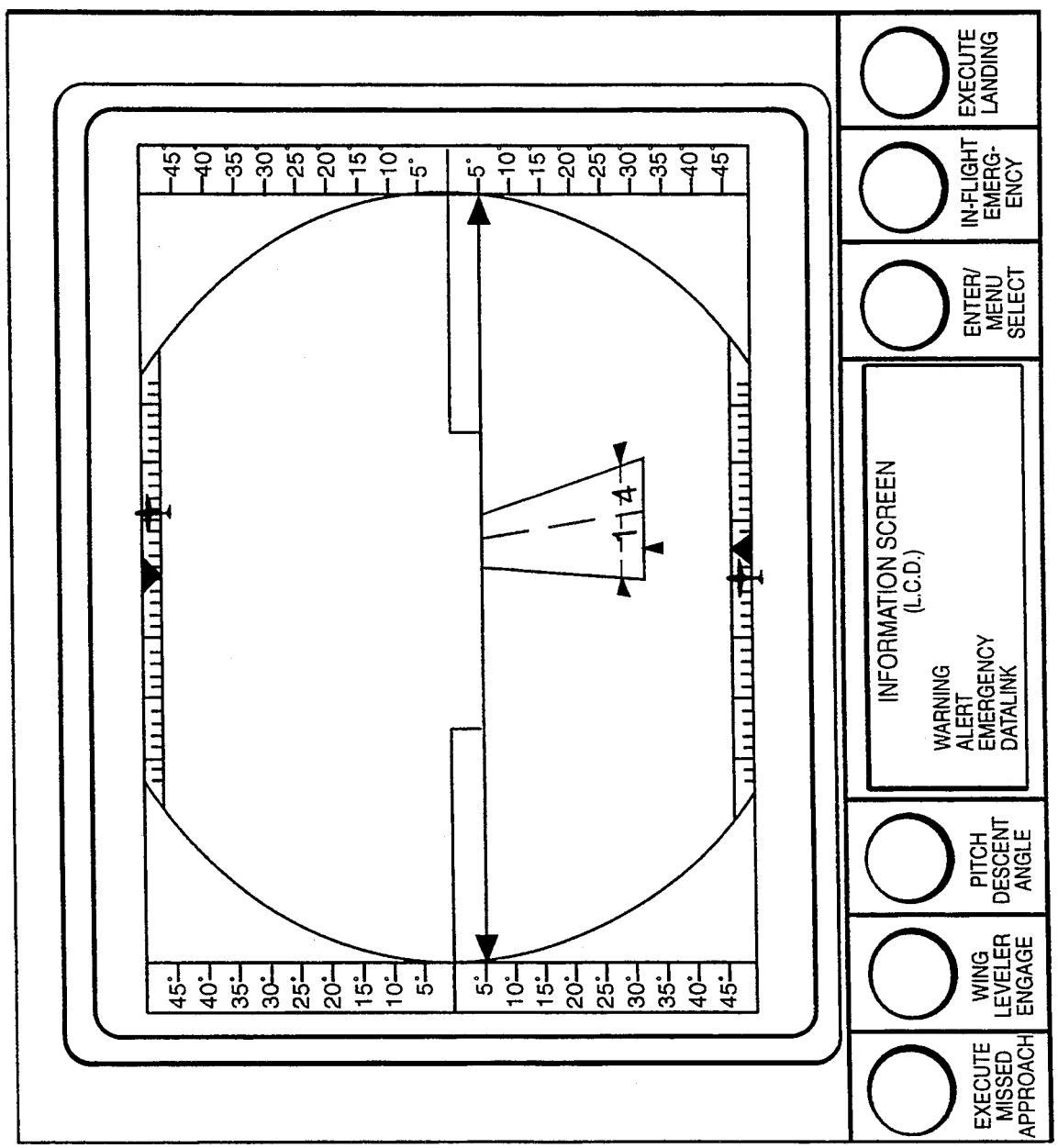

In FIG. 5G, an aircraft is about three thousand feet from the touchdown point. The aircraft is pitched nose up at 5°. There is a +10° heading error and a localizer error (the aircraft is about one hundred feet to the left of the runway centerline). There is no roll error and no glide slope error.

Figure 5H:
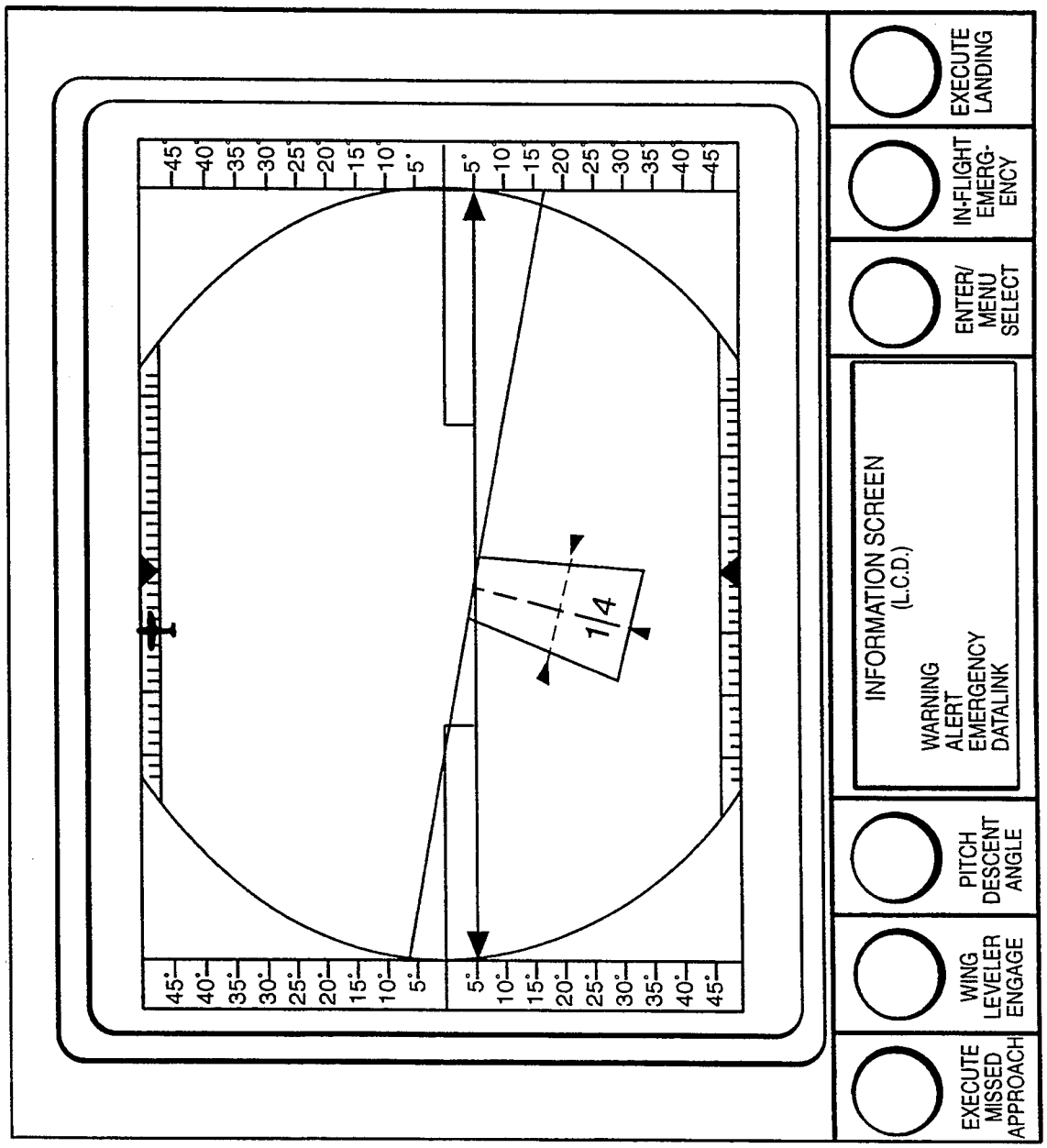

In FIG. 5H, an aircraft is about three thousand feet from the touchdown point. The aircraft is pitched nose up at 5°. There is a −10° heading error and the aircraft is banked 10° left (roll left 10°). In addition, the glide slope pointers show that the aircraft is above the glide slope and accordingly would touchdown about one thousand feet beyond the nominal touchdown point. There is no localizer error.

In FIG. 5I, an aircraft is about three thousand feet from the touchdown point. The aircraft is pitched nose down at 5°. There no heading error, but the aircraft is banked 10° right (roll right 10°). In addition, the glide slope pointers show that the aircraft is below the glide slope and accordingly would touchdown about seven hundred feet before the nominal touchdown point. There is no localizer error.

Figure 5J:
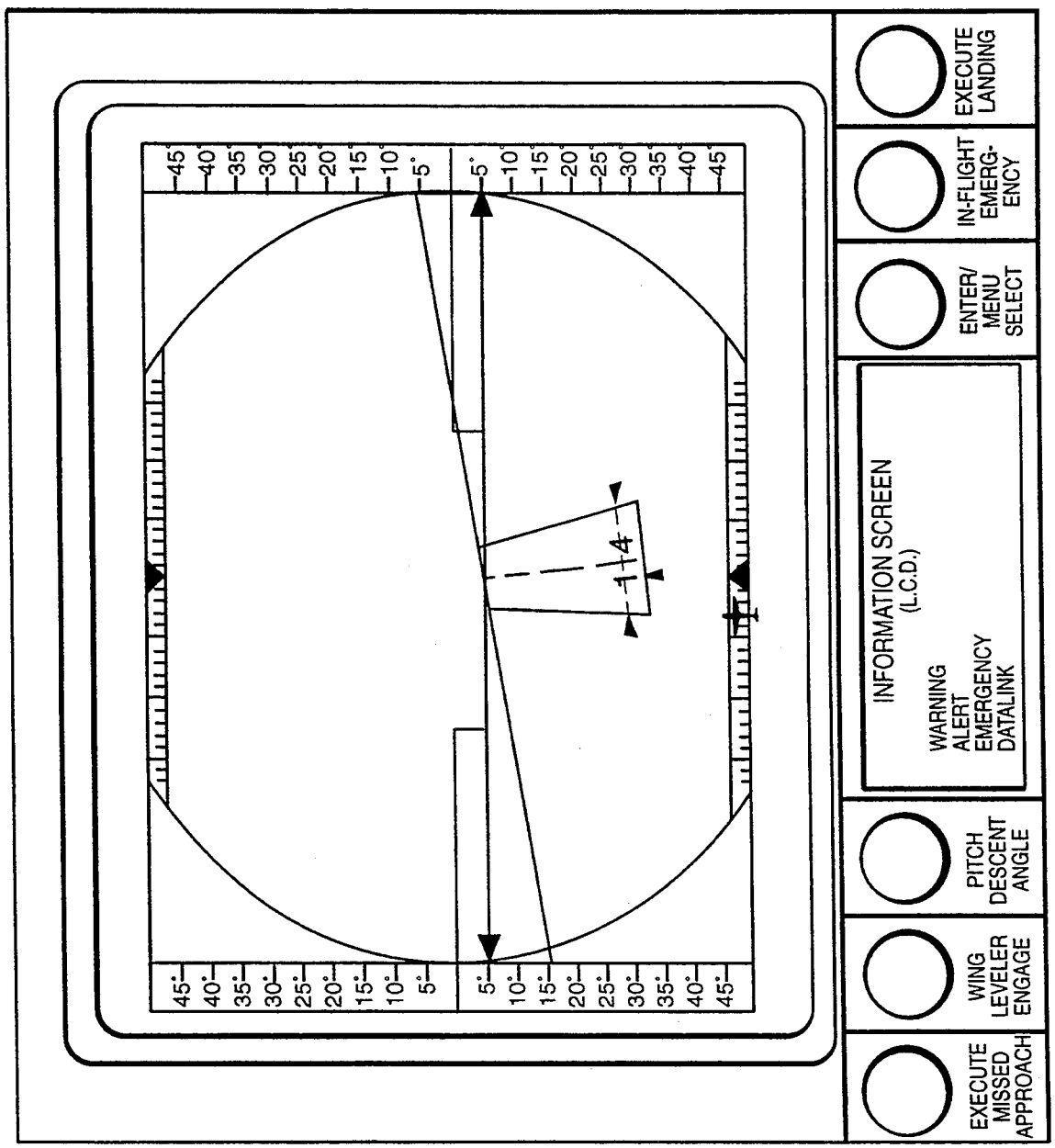

In FIG. 5J, an aircraft is about three thousand feet from the touchdown point. The aircraft is pitched nose up at 5°. There no heading error, but the aircraft is banked 10° right (roll right 10°). The localizer pointers 242 and 252 show that the aircraft would land about seventy five feet to the left of the runway centerline. There is no glide slope error.

At the middle marker, the video display 28 switches to mode of displaying information pertaining to a missed approach procedure. In this regard, the display device 28 is driven to display thereon the missed approached procedure information such as that conventionally printed on the Jepp chart for the destination runway.

While the invention has been particularly shown and described with reference to the preferred embodiments thereof, it will be understood by those skilled in the art that various alterations in form and detail may be made therein without departing from the spirit and scope of the invention. For example, while the display device 28 of the embodiment of FIG. 1 is shown as having V SYNC and H SYNC signals applied thereto, it should be understood that in other embodiments the display device may utilize a composite synchronization signal or even an synchronization signal embedded in the green video channel ("sync on green").

As another example, the DAC 52 can be a RAM-DAC or other converter which accomplishes "gamma correction" to overcome non-linearities.

The embodiments of the invention in which an exclusive property or privilege is claimed are defined as follows:

1. A navigational facilitation system for use with apparatus which at least periodically provides aircraft current situational information for an aircraft, the system comprising:
   a memory for storing, for each of a plurality of runways, runway display-generation information sufficient to generate a display of a runway perimeter;
   an input device for selecting a destination runway from the plurality of runways;
   a video display for simulating a view from a cockpit of the aircraft;
   processor connected to the aircraft situational location apparatus, to the memory, to the input device, and to the video display, for using the current situational information and the runway information for the destination runway for periodically generating display signals for the video display whereby the video display provides a simulated three dimensional view of a perimeter of the destination runway from a perspective of the cockpit of the aircraft, the simulated view of the perimeter of the destination runway being scaled and updated on the basis of the periodically provided aircraft current situational information.

2. The system of claim 1, wherein glide slope information is received from the aircraft current situational information apparatus, and wherein the processor uses the glide slope information to generate display signals whereby the video display further provides an indication of a projected touch down point of the aircraft relative to the perimeter of the destination runway.

3. The system of claim 1, wherein the aircraft current situational information apparatus provides an indication when the aircraft is at first predetermined distance from the destination runway and additionally provides an indication when the aircraft is at second predetermined distance from the destination runway, the second predetermined distance being less than the first predetermined distance, and wherein the processor generates destination runway display signals for the video display only while the aircraft is between the first predetermined distance and the second predetermined distance.

4. The system of claim 3, wherein the first predetermined distance is at an outer marker location and the second predetermined distance is at a middle marker location.

5. The system of claim 1, wherein the perimeter of the runway includes a near width edge, a far width edge, a right longitudinal edge, and a left longitudinal edge, and wherein the far width edge is displayed as a horizon reference.

6. The system of claim 1, wherein the input device is a keypad.

7. The system of claim 1, wherein the memory is a read only memory.

8. The system of claim 1, wherein the memory is a compact disk read only memory.

9. The system of claim 1, wherein the runway information includes runway size information and runway identification information, and wherein the video display further provides the identification information for the destination runway.

10. The system of claim 1, wherein the simulated view of the perimeter of the destination runway is intermittently scaled and updated.

11. The system of claim 1, wherein the video display further provides an indication of a projected position of the aircraft relative to the simulated view of the destination runway.

12. A method for facilitating the navigation of an aircraft, the aircraft having apparatus which at least periodically provides aircraft current situational information for an aircraft, the method comprising:
    retrieving, from a memory, runway information for a destination runway including display-generation information sufficient to generate a display of a runway perimeter, the memory having stored therein runway information for a plurality of runways;
    using the aircraft current situational information and the runway information for the destination runway to periodically generate display signals;
    driving the video display with the video display signals whereby the video display provides a simulated three dimensional view of a perimeter of the destination runway from a perspective of the cockpit of the aircraft, the simulated view of the perimeter of the destination runway being scaled and updated on the basis of the periodically provided aircraft current situational information.

13. The method of claim 12, wherein glide slope information is received from the aircraft current situational information apparatus, and wherein the glide slope information is used to generate display signals whereby the video display further provides an indication of a projected touch down point of the aircraft relative to the perimeter of the destination runway.

14. The method of claim 12, further comprising obtaining an indication when the aircraft is at first predetermined distance from the destination runway and an indication when the aircraft is at second predetermined distance from the destination runway, the second predetermined distance being less than the first predetermined distance,
    and wherein display signals for the video display are generated only while the aircraft is between the first predetermined distance and the second predetermined distance.

15. The method of claim 14, wherein the first predetermined distance is at an outer marker location and the second predetermined distance is at a middle marker location.

16. The system of claim 12, wherein the runway information includes runway size information and runway identification information, and wherein the video display further provides the identification information for the destination runway.

17. The system of claim 12, wherein the simulated view of the perimeter of the destination runway is intermittently scaled and updated.

18. The system of claim 12, wherein the video display further provides an indication of a projected position of the aircraft relative to the simulated view of the destination runway.

* * * * *